United States Patent
Oyman

(10) Patent No.: US 9,438,883 B2
(45) Date of Patent: Sep. 6, 2016

(54) QUALITY OF EXPERIENCE REPORTING FOR COMBINED UNICAST-MULTICAST/BROADCAST STREAMING OF MEDIA CONTENT

(71) Applicant: Intel Corporation, Santa Clara, CA (US)

(72) Inventor: Ozgur Oyman, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/628,340

(22) Filed: Sep. 27, 2012

(65) Prior Publication Data

US 2013/0268577 A1    Oct. 10, 2013

Related U.S. Application Data

(60) Provisional application No. 61/679,627, filed on Aug. 3, 2012, provisional application No. 61/621,939, filed on Apr. 9, 2012.

(51) Int. Cl.
*G06F 15/16* (2006.01)
*H04N 13/00* (2006.01)
(Continued)

(52) U.S. Cl.
CPC .......... *H04N 13/0059* (2013.01); *H04L 51/38* (2013.01); *H04L 65/1016* (2013.01); *H04L 65/1069* (2013.01); *H04L 65/4084* (2013.01); *H04L 65/4092* (2013.01);
(Continued)

(58) Field of Classification Search
CPC .................. H04N 19/00884; H04N 19/00545; H04N 19/00769; H04N 19/00369; H04N 19/00024; H04N 19/00175; H04N 21/6125; H04N 13/0059; H04N 19/00551; H04N 21/00; H04N 13/00; H04N 13/0051; H04N 19/0089
USPC ....... 709/231, 219, 217, 203, 226, 227, 232; 375/240.12, 240.02, 240.16, 240.25, 375/240.01, 240.26, 240.03, 40.13, 240.29, 375/E7.026, 240.14, 240.15, 240.17, 375/240.18, 240.24; 370/252, 230, 329, 370/350

See application file for complete search history.

(56) References Cited

U.S. PATENT DOCUMENTS 7,599,610 B2    10/2009   Benyamin et al.
8,645,562 B2 *  2/2014   Thang et al. ................. 709/231
(Continued)

FOREIGN PATENT DOCUMENTS

CN    101632286 A    1/2010
CN    102118270 A    7/2011
(Continued)

OTHER PUBLICATIONS

International Search Report and Written Opinion for International Application No. PCT/US2013/035832, mailed Jul. 29, 2013.
(Continued)

*Primary Examiner* — Saket K Daftuar
(74) *Attorney, Agent, or Firm* — Schwabe, Williamson & Wyatt, P.C.

(57) ABSTRACT

Embodiments of the present disclosure describe devices, methods, computer-readable media and systems configurations for monitoring and reporting quality of experience (QoE) metrics that are associated with an access method. Other embodiments may be described and claimed.

12 Claims, 7 Drawing Sheets

(51) Int. Cl.

| | | |
|---|---|---|
| *H04W 4/06* | (2009.01) | |
| *H04L 29/06* | (2006.01) | |
| *H04N 21/258* | (2011.01) | |
| *H04N 21/442* | (2011.01) | |
| *H04N 21/61* | (2011.01) | |
| *H04N 21/81* | (2011.01) | |
| *H04N 21/845* | (2011.01) | |
| *H04N 21/262* | (2011.01) | |
| *H04L 12/58* | (2006.01) | |
| *H04N 21/643* | (2011.01) | |
| *H04W 4/14* | (2009.01) | |
| *H04W 60/04* | (2009.01) | |
| *H04W 76/02* | (2009.01) | |
| *H04N 21/235* | (2011.01) | |
| *H04N 19/46* | (2014.01) | |
| *H04N 21/6437* | (2011.01) | |
| *H04N 19/105* | (2014.01) | |
| *H04N 19/147* | (2014.01) | |
| *H04N 19/196* | (2014.01) | |
| *H04N 19/463* | (2014.01) | |
| *H04N 19/597* | (2014.01) | |
| *H04N 19/70* | (2014.01) | |
| *H04N 19/80* | (2014.01) | |

(52) U.S. Cl.
CPC ............ *H04L 65/60* (2013.01); *H04L 65/602* (2013.01); *H04L 65/607* (2013.01); *H04L 65/608* (2013.01); *H04L 65/80* (2013.01); *H04N 13/00* (2013.01); *H04N 21/2353* (2013.01); *H04N 21/25825* (2013.01); *H04N 21/25833* (2013.01); *H04N 21/26258* (2013.01); *H04N 21/4424* (2013.01); *H04N 21/44209* (2013.01); *H04N 21/6125* (2013.01); *H04N 21/6131* (2013.01); *H04N 21/643* (2013.01); *H04N 21/816* (2013.01); *H04N 21/8456* (2013.01); *H04W 4/06* (2013.01); *H04W 4/14* (2013.01); *H04W 60/04* (2013.01); *H04W 76/026* (2013.01); *H04N 19/00545* (2013.01); *H04N 19/105* (2014.11); *H04N 19/147* (2014.11); *H04N 19/196* (2014.11); *H04N 19/46* (2014.11); *H04N 19/463* (2014.11); *H04N 19/597* (2014.11); *H04N 19/70* (2014.11); *H04N 19/80* (2014.11); *H04N 21/6437* (2013.01)

(56) References Cited

U.S. PATENT DOCUMENTS

| | | | |
|---|---|---|---|
| 2003/0086699 A1 | 5/2003 | Benyamin et al. | |
| 2005/0089043 A1 | 4/2005 | Seckin et al. | |
| 2005/0210145 A1* | 9/2005 | Kim et al. | 709/231 |
| 2007/0168523 A1 | 7/2007 | Jiang et al. | |
| 2007/0237098 A1 | 10/2007 | Wang et al. | |
| 2008/0098446 A1 | 4/2008 | Seckin et al. | |
| 2008/0228912 A1 | 9/2008 | Vedantham et al. | |
| 2009/0316615 A1 | 12/2009 | Vedantham et al. | |
| 2011/0281687 A1* | 11/2011 | Gilley et al. | 482/8 |
| 2011/0306305 A1* | 12/2011 | Huang | 455/67.11 |
| 2012/0023254 A1* | 1/2012 | Park et al. | 709/231 |
| 2012/0042050 A1* | 2/2012 | Chen et al. | 709/219 |
| 2012/0042090 A1* | 2/2012 | Chen et al. | 709/231 |
| 2012/0124179 A1* | 5/2012 | Cappio et al. | 709/219 |
| 2012/0173753 A1* | 7/2012 | Moorthy | 709/231 |
| 2012/0185607 A1* | 7/2012 | Rhyu | H04N 21/6125 709/231 |
| 2012/0209952 A1* | 8/2012 | Lotfallah et al. | 709/217 |
| 2012/0230401 A1* | 9/2012 | Chen et al. | 375/240.12 |
| 2012/0259946 A1* | 10/2012 | Stockhammer et al. | 709/217 |
| 2013/0007814 A1* | 1/2013 | Cherian et al. | 725/62 |
| 2013/0028118 A1* | 1/2013 | Cherian et al. | 370/252 |
| 2013/0035209 A1* | 2/2013 | Gilley et al. | 482/9 |
| 2013/0036234 A1* | 2/2013 | Pazos et al. | 709/231 |
| 2013/0051271 A1* | 2/2013 | Cao et al. | 370/252 |
| 2013/0060911 A1* | 3/2013 | Nagaraj et al. | 709/219 |
| 2013/0103849 A1* | 4/2013 | Mao et al. | 709/231 |
| 2013/0111520 A1* | 5/2013 | Lo et al. | 725/35 |
| 2013/0124749 A1* | 5/2013 | Thang et al. | 709/231 |
| 2013/0148525 A1* | 6/2013 | Cuadra Sánchez et al. | 370/252 |
| 2013/0159498 A1* | 6/2013 | Funge et al. | 709/224 |
| 2013/0166771 A1* | 6/2013 | Thang et al. | 709/231 |
| 2013/0185353 A1* | 7/2013 | Rondao Alface et al. | 709/203 |
| 2013/0185398 A1* | 7/2013 | Thang et al. | 709/219 |
| 2013/0191550 A1* | 7/2013 | Hannuksela | 709/231 |
| 2013/0215813 A1 | 8/2013 | Kotecha et al. | |
| 2013/0227053 A1* | 8/2013 | Bouazizi | 709/217 |
| 2013/0246846 A1* | 9/2013 | Oyman | 714/18 |
| 2013/0262693 A1* | 10/2013 | Phillips et al. | 709/231 |
| 2013/0282877 A1* | 10/2013 | Keum et al. | 709/219 |
| 2014/0006564 A1* | 1/2014 | Thang et al. | 709/219 |

FOREIGN PATENT DOCUMENTS

| | | |
|---|---|---|
| TW | 201322793 A | 6/2013 |
| TW | 201401849 A | 1/2014 |
| TW | 201408055 A | 2/2014 |
| WO | WO2005022852 A1 | 3/2005 |
| WO | WO2010/000946 A1 | 1/2010 |
| WO | WO2010/079471 A1 | 7/2010 |
| WO | WO2011158221 A2 | 12/2011 |

OTHER PUBLICATIONS

Mok et al. "QDASH: A QoE-Aware DASH System" In: Proceedings of the 3rd Multimedia Systems Conferece (MMSys ' 12). Feb. 22-24, 2012.

3GPP TS 26.247 V10.0.0, "UMTS; Transparent End-to-End Packet-Switched Streaming Service (PSS); Progressive Download and Dynamic Adaptive Streaming over HTTP (3GP-DASH) (Release 10) ", Jun. 2011.

3GPP, "Multimedia Broadcast/Multicast Service (MBMS); Protocols and codecs (Release 11)," 3GPP TS 26.346 V11.0.0 (Mar. 2012); Mar. 16, 2012, Lte Advanced, 164 pages.

Oyman, et al., "Quality of Experience for HTTP Adaptive Streaming Services," QoE Management in Emerging Multimedia Services, IEEE Communications Magazine, Apr. 2012, pp. 20-27.

3GPP, "QoE for Progressive Download and DASH," TS 26.247 version 10.0.0 Release 10, ETSI TS 126 247 V10.0.0 (Jun. 2011), pp. 46-57.

Search Report issued Mar. 31, 2014 from Belgium Patent Application No. 2013/0245.

Search Report issued Mar. 7, 2014 from Belgium Patent Application No. 2013/0739.

Search Report issued Mar. 7, 2014 from Dutch Patent Application No. 2011716.

Systems Subgroup, "Technologies under Consideration for ISO/IEC 23009-1 Dynamic Adaptive Streaming over HTTP," International Organisation for Standarisation, Oreganisation Internationale De Normalisation, ISO/IEC JTC1/SC29/WG11, Coding of Moving Pictures and Audio, ISO/IEC JTC1/SC29/WG11 MPEG2011/N12330, Nov. 2011, Geneva, Switzerland, 7 pages.

3GPP, "Universal Mobile Telecommunications System (UMTS); LTE; Transparent end-to-end Packet-switched Streaming Service (PSS); Progressive Download and Dynamic Adaptive Streaming over HTTP (3GP-DASH) (3GPP TS 26.247 version 10.1.0 Release 10)," ETSI TS 126 247 V10.1.0 (Jan. 2012), 114 pages.

Office Action issued Jun. 27, 2014 from Spanish Divisional Application No. P201331593.

Office Action issued Jul. 9, 2014 from Spanish Application No. P201330498.

Corrected Search Report issued Aug. 7, 2014 from Dutch Application No. 2010605.

International Preliminary Report on Patentability issued Oct. 23, 2014 from International Application No. PCT/US2013/035832.

(56) References Cited

OTHER PUBLICATIONS

Office Action issued Nov. 12, 2014 from Spanish Divisional Patent Application No. P201331593.
Search Report issued Jun. 16, 2014 from French Divisional Application No. 1360737.
Search Report issued Apr. 1, 2014 from Dutch Application No. 2010605.
Office Action issued Jun. 11, 2014 from Swedish Application No. 1350442-8.
Office Action issued Jun. 11, 2014 from Swedish Divisional Application No. 1351289-9.
Office Action issued Nov. 25, 2014 from Spanish Patent Application No. 201330498.
Office Action issued Jul. 13, 205 from Korean Patent Application No. 10-2014-7026470.
Extended European Search Report issued Jul. 2, 2015 from European Patent Application No. 13775131.9.
3GPP, "Technical Specification Group Services and System Aspects; IP Multimedia Subsystem (IMS) based Packet Switch Streaming (PSS) and Multimedia Broadcast/Multicast Service (MBMS) User Service; Protocols Release 10)," 3GPP TS 26.237 V10.4.0 (Nov. 2011), Dec. 21, 2011, 140 pages.
Office Action issued Apr. 21, 2015 from Spanish Divisional Patent Application No. P201331593.
"3GPP, ""Universal Mobile Telecommunications System (UMTS);LTE; Transparent end-to-end Packet-switched Streaming Service (PSS);Protocols and codecs,"" 3GPP TS 26.234 version 10.3.0 Release 10, ETSI TS 126 234 V10.3.0 (Jan. 2012), Lte Advanced, 172 pages"
"3GPP, ""Universal Mobile Telecommunications System (UMTS);LTE; Transparent end-to-end Packet-switched Streaming Service (PSS);Progressive Download and Dynamic Adaptive Streaming over HTTP (3GP-DASH),"" 3GPP TS 26.247 version 10.1.0 Release 10, ETSI TS 126 247 V10.1.0 (Jan. 2012), Lte Advanced, 114 pages"
Office Action issued May 27, 2015 from Taiwan Patent Application No. 102111885 (Partial Translation).
Search Report issued Apr. 29, 2015 from Spanish Patent Application No. P201330498.
Qualcomm Incorporated, "MPD Profiling to Support DASH over MBMS," 3GPP TSG-SA4 Meeting #67, S4-120061, V10.2.0, Jan. 30-Feb. 3, 2012, Edinburgh, UK, 6 pages.
3GPP, ""Universal Mobile Telecommunications System (UMTS); LTE; Transparent end-to-end Packet-switched Streaming Service (PSS);Progressive Download and DynamicAdaptive Streaming over HTTP (3GP-DASH) (3GPP TS 26.247 version 10.0.0 Release 10),"" ETSI TS 126 247 V10.0.0 (Jun. 2011), Lte Advanced, 2012 [retrieved 23.04.2015], 96 pages.
Nokia Corporation, "MPD Changes to include MBMS access information," 3GPP TSG-SA4 Meeting #66, S4-110931, V10.0.0, Nov. 7-11, 2011, Jeju Island, Korea, 8 pages.
Office Action issued Nov. 10, 2015 from Japanese Patent Application No. 2015-501957.
Office Action and Search Report issued Nov. 16, 2015 from Chinese Patent Application No. 201310120966.4
Huang et al, "Toward Efficient and Accurate QoE Reporting for Emerging Streaming Services," 2009 IFIP/IEEE Inti Symposium on Integratec Network Management—Workshops, Dec. 31, 2009, 6 pages.
Office Action issued Jun. 3, 2016 from Swedish Divisional Patent Application No. 1351289-2, 9 pages.

* cited by examiner

QUALITY OF EXPERIENCE REPORTING FOR COMBINED UNICAST-MULTICAST/BROADCAST STREAMING OF MEDIA CONTENT

CROSS REFERENCE TO RELATED APPLICATIONS

The present application claims priority to U.S. Provisional Patent Application No. 61/621,939, filed Apr. 9, 2012, entitled "ADVANCED WIRELESS COMMUNICATION SYSTEMS AND TECHNIQUES," and to U.S. Provisional Patent Application No. 61/679,627, filed Aug. 3, 2012, entitled "ADVANCED WIRELESS COMMUNICATION SYSTEMS AND TECHNIQUES," the entire disclosures of which are hereby incorporated by reference.

FIELD

Embodiments of the present invention relate generally to the field of wireless communications, and more particularly, to quality of experience reporting for dynamic streaming of media content.

BACKGROUND

Hypertext transfer protocol (HTTP) streaming is spreading widely as a form of multimedia delivery of Internet video. HTTP-based delivery provides reliability and deployment simplicity due to the already broad adoption of both HTTP and its underlying transmission control protocol (TCP)/Internet protocol (IP) protocols. Moreover, HTTP-based delivery enables easy and effortless streaming services by avoiding network address translation (NAT) and firewall traversal issues. Finally, HTTP-based streaming also provides the ability to use standard HTTP servers and caches instead of specialized streaming servers and has better scalability due to minimal state information on the server side.

Dynamic adaptive streaming over HTTP (DASH) standardized in 3GPP TS 26.247 V.10.2.0 (Jun. 29, 2012) is a new technology in comparison to real-time streaming protocol (RTSP)-based adaptive streaming. Prior to the use of DASH, standardized progressive download methods were available for media delivery from standard HTTP Web servers. In HTTP-based progressive download, clients can seek to positions in the media file by performing byte range requests to the Web server. Disadvantages of HTTP-based progressive download are mostly that bandwidth may be wasted if the user decides to stop watching the content after progressive download has started (e.g., switching to another content), it is not really bitrate adaptive and it does not support live media services. DASH technology addresses the weaknesses of real time protocol (RTP)/RTSP-based streaming and HTTP-based progressive download.

In DASH, a media presentation description (MPD) metadata file provides information on the structure and different versions of the media content representations stored in the server (including different bitrates, frame rates, resolutions, codec types, etc.). In addition, DASH also specifies the segment formats, i.e., containing information on the initialization and media segments for a media player (the media player looks at initialization segment to understand container format and media timing info) to ensure mapping of segments into media presentation timeline for switching and synchronous presentation with other representations. Based on this MPD metadata information that describes the relation of the segments and how they form a media presentation, clients request the segments using HTTP GET or partial GET methods. The client fully controls the streaming session, i.e., it manages the on-time request and smooth playout of the sequence of segments, potentially adjusting bitrates or other attributes, for example, to react to changes of the device state or the user preferences.

DASH provides the ability to dynamically switch between different bitrate representations of the media content as the available bandwidth changes. Hence, DASH allows faster adaptation to changing network and wireless link conditions, user preferences, and device capabilities (e.g., display resolution, CPU, memory resources, etc.). Such dynamic adaptation provides better user quality of experience (QoE), with shorter startup delays, fewer rebuffering events, etc.

Multimedia Broadcast Multicast Services (MBMS) is a point-to-multipoint system utilized on cellular networks operating in accordance with one of the cellular standards promulgated by the Third Generation Partnership Project (3GPP). It is designed for efficient delivery of popular content to many receivers based on broadcast and multicast techniques and was first introduced in release six of the 3GPP Universal Mobile Telecommunications System (UMTS) specification as an optional feature, and was further optimized in the later 3GPP releases based on several enhancements such as multicast broadcast single frequency network (MBSFN) functionality. At the service layer, MBMS also defines delivery protocols for both streaming of multimedia content and reliable download of files, based on the transport-layer protocol based on the user datagram protocol (UDP), RTP for streaming and File Delivery over Unidirectional Transport (FLUTE) for file delivery. MBMS has been adopted as the enhanced MBMS (eMBMS) mode in 3GPP-based Long Term Evolution (LTE) standards development corresponding to 3GPP release eight and onwards.

DASH-formatted content could be delivered to the UE using both MBMS download delivery methods and/or HTTP-based delivery methods. MBMS-based DASH delivery option may not be available in some service areas, in which cases those services might be alternatively provided via unicast. In case of DASH-formatted content delivery over MBMS, FLUTE transport protocol may be used. FLUTE as defined in RFC3926 permits delivery of DASH segments over MBMS so that the client observes them being delivered over HTTP/TCP. HTTP-URL is assigned to each delivered object in FLUTE and the HTTP-URL maps the Segment URLs in the MPD. The UE would identify the received DASH representations based on the comparison of the HTTP URLs contained in the MPD and the URL information included in the FLUTE packets.

Different DASH representations may be available over unicast/HTTP and MBMS/FLUTE requiring a switch for accessing different versions of the DASH content. Switching cases between unicast/HTTP and MBMS/FLUTE may occur in these scenarios, including user-initiated content switching with access change as well as application-initiated access change. In summary, it is possible that the client switches between the unicast and multicast/broadcast access methods during the content streaming and moreover certain DASH-formatted components (representations, segments, etc.) may be received over multicast/broadcast and other components may be received over unicast with synchronization at the client.

Given such availability of unicast/HTTP and broadcast/FLUTE access methods for DASH-formatted content, it is important to ensure continuity and consistent user experience for the entire content streaming.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, computer-readable media, and apparatuses for QoE reporting and service provisioning adjustment with respect to dynamically streamed video content.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
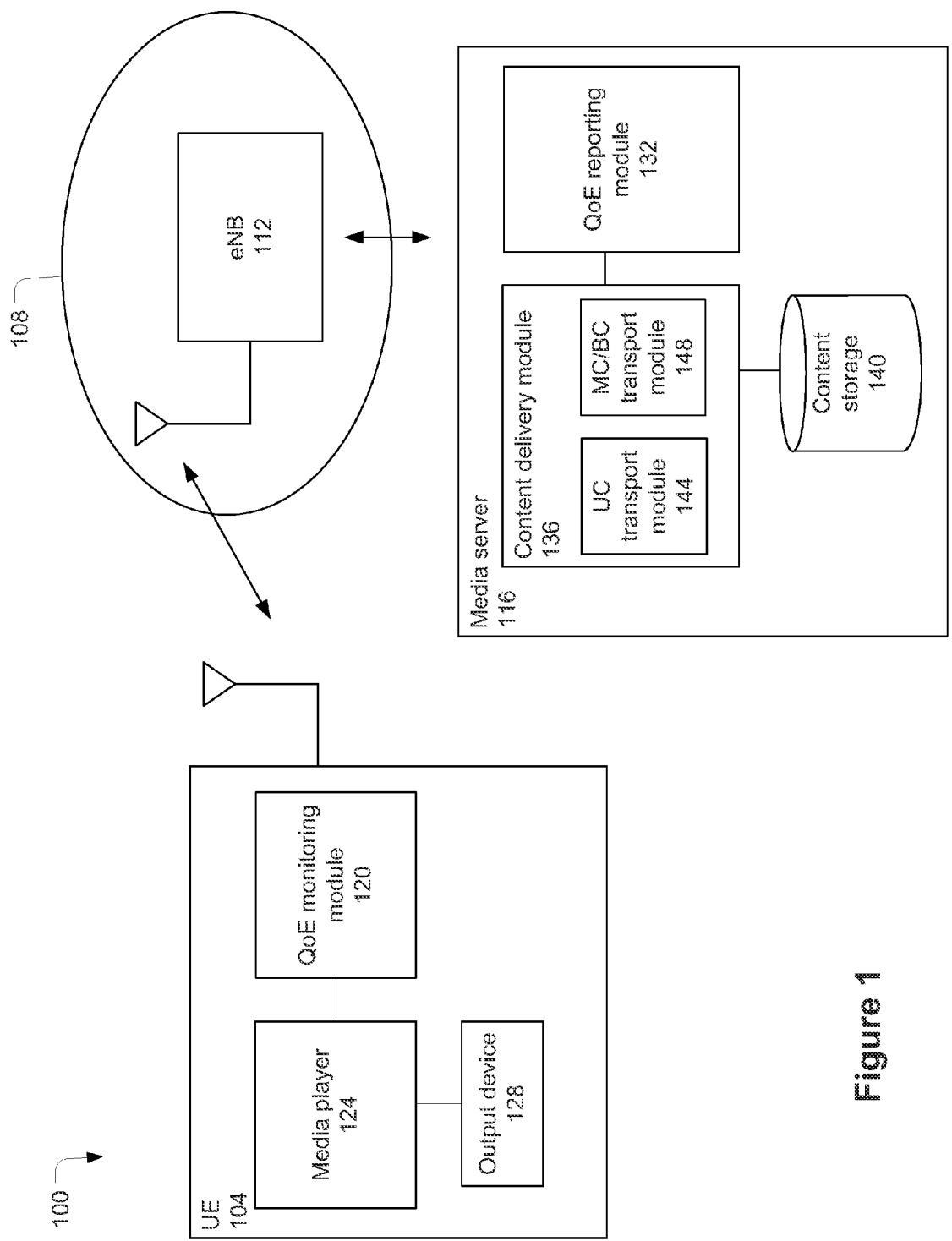
FIG. 1 schematically illustrates a communication network in accordance with various embodiments.

FIG. 1 schematically illustrates a network environment 100 in accordance with various embodiments. The network environment 100 includes a user equipment (UE) 104 wirelessly coupled with a radio access network (RAN) 108. The RAN 108 may include an enhanced node base station (eNB) 112 configured to communicate with the UE 104 via an over-the-air (OTA) interface. The RAN 108 may be part of a 3GPP LTE Advanced (LTE-A) network and may be referred to as an evolved universal terrestrial radio access network (EUTRAN). In other embodiments, other radio access network technologies may be utilized.

The UE 104 may communicate with a remote media server 116 through the RAN 108. While the eNB 112 is shown communicating directly with the media server, it will be understood that the communications may flow through a number of intermediate networking components, e.g., switches, routers, gateways, etc., in various embodiments. For example, in some embodiments, the RAN 108 may be coupled with a core services network (CSN) that communicatively couples the RAN 108 with a larger network, e.g., a wide area network, of which the media server 116 may be considered a part.

Figure 2:
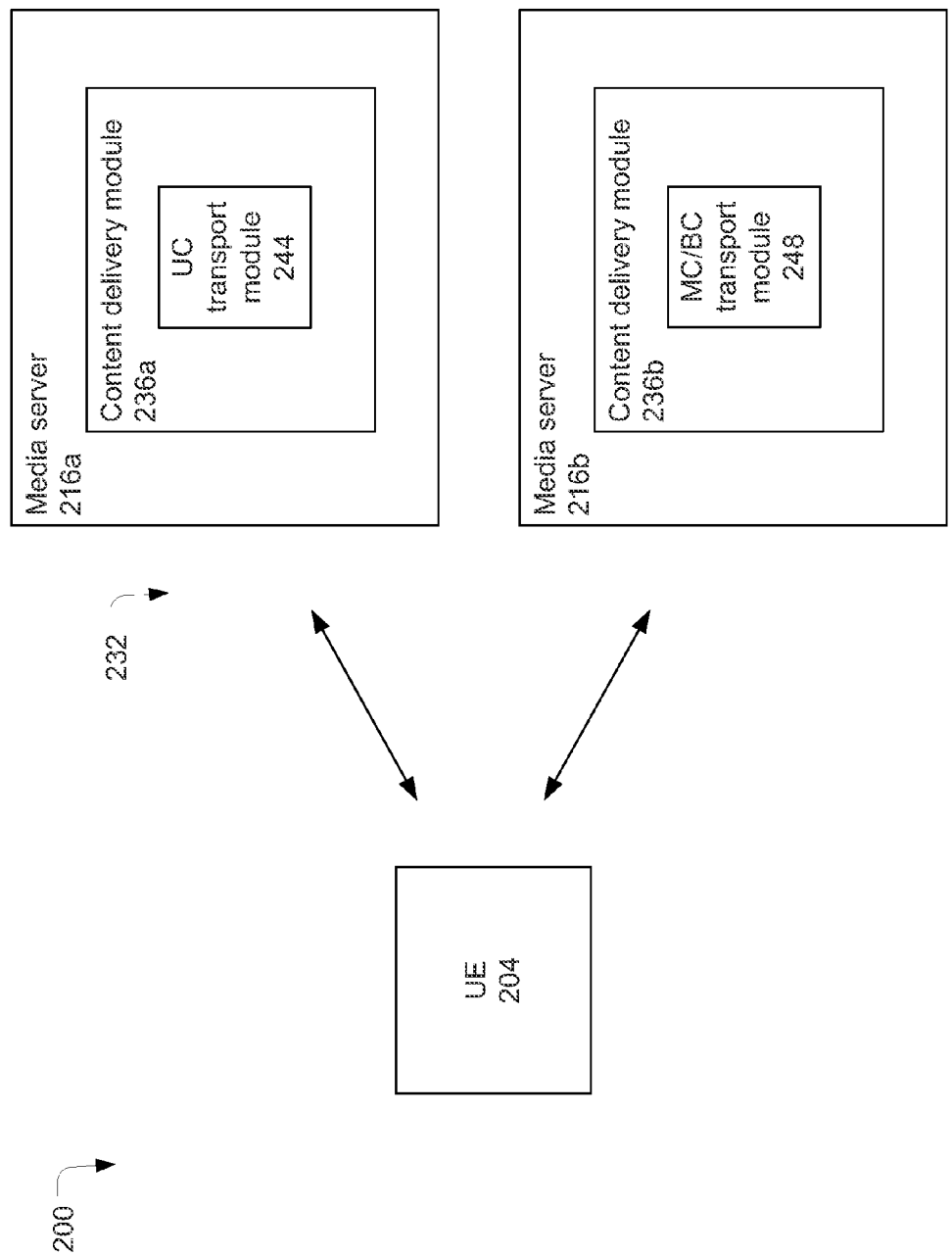
FIG. 2 schematically illustrates a communication network in accordance with various embodiments.

The UE 104 and media server 116 may have a number of components that are configured to facilitate access, storage, transmission, and display of multimedia content. In relevant part, for example, the UE 104 may include a QoE monitoring module 120, a media player 124, and one or more output devices 128. The media server 116 may include a QoE reporting module 132, a content delivery module 136, and a content storage 140. In various embodiments, the QoE reporting module 132 may be present in a different location outside of the media server 116. The content delivery module 136 may include a unicast (UC) transport module 144 (e.g., for HTTP-based delivery) and a multicast/broadcast (MC/BC) transport module 148 (e.g., for MBMS-based delivery). In various embodiments, one or more of the components of the media server 116 may be disposed remotely from one another. For example, FIG. 2 illustrates an embodiment in which a UE 204 may communicate with a first media server 216a, which includes a content delivery module 236a having a UC transport module 244, and a second media server 216b, which includes a content delivery module 236b having an MC/BC transport module 248. The UE 204 may be coupled to these media servers at different times due to, e.g., coverage area in which the UE 104 is present. In other embodiments, the UE 104 may be coupled to both of these media servers at the same time and, e.g., receive different portions of the multimedia content from the different servers.

Briefly, referring again to FIG. 1, the content delivery module 136 may access media content (e.g., audio and/or video content) in the content storage 140 and format the media content in accordance with a dynamic adaptive streaming protocol, e.g., DASH. The DASH-formatted content may be provided to a transport module, e.g., either the UC transport module 144 or the MC/BC transport module 148, for delivery to the UE 104 through the RAN 108. The media player 124 of the UE 104 may receive the streamed content, delivered by a unicast access method or a multicast/broadcast access method, decode the content and provide the content to the output devices 128, which may include a display, speakers, etc.

In some embodiments, the unicast access method may be an HTTP-based access method, e.g., as specified in 3GPP TS 26.247, while the multicast/broadcast access method may be an MBMS and/or file delivery over unidirectional transport (FLUTE)-based access method, e.g., as specified in 3GPP TS 26.346, V.11.1.0 (Jun. 29, 2012).

In some embodiments, the media server 116 may dynamically switch between the different access methods for delivery of some or all of the DASH-formatted content. This may be based on difference in availability and/or preference of the access methods. For example, in an embodiment in which the transport modules are remotely disposed from one another, there may be nonoverlapping service areas associated with each transport module. If the UE 104 travels to an area that is not supported by the transport module currently providing the streaming content, the content delivery module 136 or the UE 104 may switch to the other transport module. In some embodiments, when both access methods are available, one may be preferred over the other. For example, it may be a network preference that DASH-formatted content be provided to UEs by MC/BC access method whenever possible. Thus, if both transport modules are capable of providing the DASH-formatted content to the UE 104, the MC/BC transport module 148 may be configured as the preferred module.

In some embodiments, different DASH components (e.g., representations, segments, etc.) may be available over, or preferably provided by, different access methods. Thus, in some embodiments a switch between access methods (hereinafter "access switch") may occur to access different components based on available and preferred access method. In some embodiments, a first set of the DASH components may be provided by the UC transport module 144 and a second set of the DASH-formatted components may be provided by the MC/BC transport module 148. The media player 124, upon receiving the first and second sets, may synchronize the content prior to rendering the media presentation on the output device 128.

In light of the availability of both unicast/multicast/broadcast access methods, and switching there between, embodiments of the present invention provide for procedures to ensure continuous and consistent user experience for the entire content streaming session.

Conventional QoE reporting is based on assumptions of a single access method and is therefore insufficient to precisely identify certain events that may cause QoE degradation during streaming over combined UC and MC/BC delivery. For example, an access switch may lead to QoE degradation in the form of playback interruptions, even if the DASH-formatted content could be delivered in an interrupt-free manner when the access methods are employed independently. This may be due to a timing offset between the DASH segment reception times over MBMS and unicast/HTTP (including, e.g., broadcast multicast service center (BM-SC) processing, MBMS forward error correction (FEC) buffering and HTTP request-response delays), which may not be negligible in many scenarios. In other words, even when the qualities of the unicast and broadcast/multicast access methods are sufficiently high to deliver DASH-formatted content in an interrupt-free manner, the latencies introduced during access switching may cause playback interruptions, leading to QoE degradation. This is of course just one demonstrative example, and access switching may have a net impact on the end user QoE in additional/alternative examples.

Due to their direct impact to the DASH client experience, embodiments of the present invention provide for the monitoring of access switching events in conjunction with the existing QoE metrics in order to better interpret client experience and identify causes of QoE degradation for delivery of DASH-formatted content over unicast and multicast/broadcast access methods.

It may be noted that while embodiments are described with respect to DASH-formatted content, concepts of the embodiments may be equally applicable to other types of streaming content.

A number of QoE metric definitions for delivery of DASH-formatted content are provided below to better capture the client experience during access switching events such as those during combined unicast-multicast/broadcast delivery. As used herein, combined unicast-multicast/broadcast delivery means that a first portion of the media content is delivered by a unicast access method, while a second portion of the media content is delivered by a multicast/broadcast access method. The same QoE metrics could also be used to capture client experience during any access switching including, e.g., a switch to a different content delivery network (CDN). A CDN may be where media content is stored and streaming is initiated. The CDN may include the media server 116. In some embodiments, the QoE metrics for such access switching events include, but are not limited to, representation switch event, playlist, and/or MPD information metrics.

In some embodiments, the QoE monitoring module 120 may record a list of representation switch events that took place during a measurement interval. A representation switch event corresponds to a switch from a first media content representation to a second media content representation. Each representation switch event may include attributes to indicate the switched-to representation, a real time of the switch event (e.g., wall-clock time), a media time of the earliest media sample (out of all media components) played out from the switched-to representation, a level identifying a sub-representation (e.g., a level of the switched-to representation), and an access method by which the switched-to representation or sub-representation is received. In some embodiments, the access method may be unicast (e.g., HTTP) or multicast/broadcast (e.g., MBMS).

Table 1 illustrates a representation switch event list in accordance with some embodiments.

TABLE 1

| Key | Type | Description |
| --- | --- | --- |
| RepSwitchList | List | List of representation switch events |
| Entry | Object | A representation switch event. |
| t | Real Time | Time of the switch event. |
| mt | Media Time | The media time of the earliest media sample (out of all media components) played out from the "to" representation. |
| to | String | Value of Representation@id identifying the switch-to representation. |

TABLE 1-continued

| Key | Type | Description |
| --- | --- | --- |
| Lto | Integer | If present, value of SubRepresentation@level within Representation identifying the switch-to level of the Representation |
| accessMethod | String | Access method based on which the switch-to representation or sub-representation is being received. Values include 'HTTP', 'MBMS'. |

Including the 'accessMethod' attribute corresponding to 'switch-to representation' allows for the identification of the access mechanism used to transport the related DASH-formatted content. It also sheds light on the UE's adaptation behavior not only in terms of how the UE switches between different DASH representations (or sub-representations), but also in terms of how the UE switches across access methods, e.g., HTTP and MBMS/FLUTE, in response to, e.g., an event where the MBMS coverage may be lost and alternative reception of the same service is possible over unicast/HTTP. In such a setting, the 'accessMethod' attribute can facilitate logging of such access switching events in conjunction with the selected DASH representations. When combined with other QoE metrics such as loss of objects and rebuffering events, the service provider can identify in detail the QoE behavior and client experience for DASH delivery during access switching events.

Figure 3:
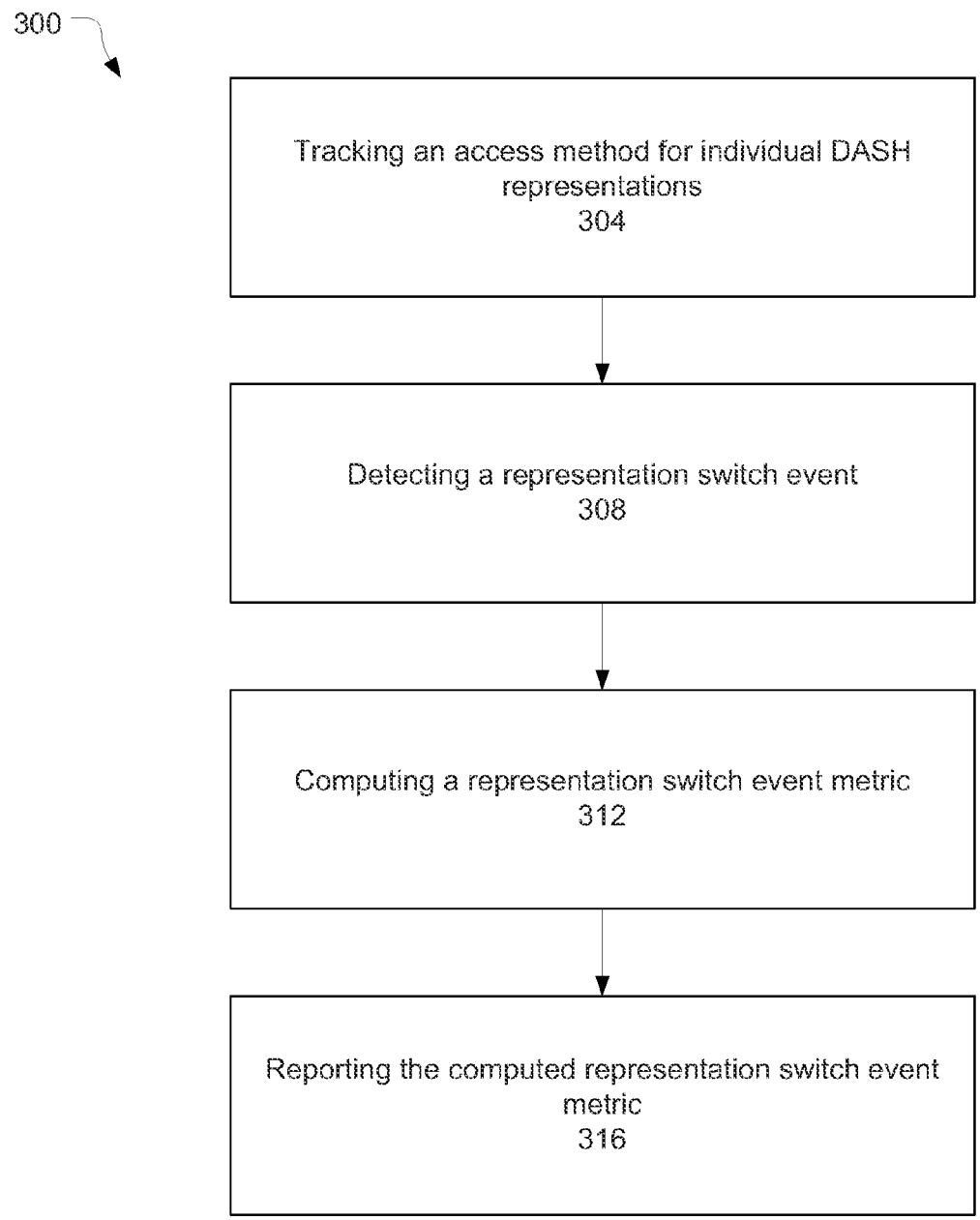
FIG. 3 illustrates a method of tracking and reporting a QoE metric in accordance with various embodiments.

FIG. 3 illustrates a tracking and reporting method 300 in accordance with some embodiments. Method 300 may be performed by a QoE monitoring module of a UE, such as QoE monitoring module 120 of UE 104. In some embodiments, the UE may include and/or have access to one or more computer-readable media having instructions stored thereon, that, when executed, cause the UE, or QoE monitoring module, to perform the method 300.

At 304, the method may include tracking an access method for individual DASH representations.

At 308, the method may include detecting a representation switch event. The representation switch event may be a switch from a media player receiving a first DASH representation to a second DASH representation.

After detecting the representation switch event at 308, the method may include computing a representation switch event metric at 312. In some embodiments, the computing of the representation switch event metric may include recording the access method of the switched-to representation. In some embodiments, other elements of switch event may be recorded in the representation switch event metric.

At 316, the method may include reporting the computed representation switch event metric. Reporting of the computed representation switch event metric may be done by transmitting the metric to a QoE reporting module, e.g., QoE reporting module 132 of media server 116.

In some embodiments, the QoE monitoring module 120 may record a playlist of the measurement interval. Decoded samples of the DASH-formatted content may generally be rendered in presentation time sequence, each at or close to its specified presentation time. A compact representation of the information flow can thus be constructed from a list of time periods during which samples of a single representation were continuously rendered, such that each was presented at its specified presentation time to some specific level of accuracy (e.g. +/−10 ms). Such a sequence of periods of continuous delivery may be started by a user action that requests playout to begin at a specified media time (this could be a "play", "seek" or "resume" action) and continues until playout stops either due to a user action, the end of the content, or a permanent failure.

The playlist metric recorded by the QoE monitoring module 120 may be used to log playlist elements for a list of playback periods in the measurement interval, where each playback period is the time interval between a user action and whichever occurs soonest of the next user action, the end of playback or a failure that stops playback. For each playback period, the QoE monitoring module 120 may measure and report various playlist elements such as, e.g., the identifiers of the representations that were rendered and their rendering times (in media time) and durations, playback speed relative to normal playback speed (e.g., to track trick modes such as fast forward or rewind) and reasons for why continuous playback of this representation was interrupted.

Table 2 illustrates a playlist metric in accordance with some embodiments.

TABLE 2

| Key | Type | Description |
| --- | --- | --- |
| PlayList | List | A list of playback periods. A playback period is the time interval between a user action and whichever occurs soonest of the next user action, the end of playback or a failure that stops playback. |
| Entry | Object | A record of a single playback period. |
| start | Real Time | Timestamp of the user action that starts the playback period. |
| mstart | Media Time | The presentation time at which playout was requested by the user action. |
| starttype | Enum | Type of user action which triggered playout<br>New playout request (e.g. initial playout or seeking)<br>Resume from pause<br>Other user request (e.g. user-requested quality change)<br>Start of a metrics collection period (hence earlier entries in the play list not collected) |

TABLE 2-continued

| Key | Type | Description |
|---|---|---|
| Trace | List | List of periods of continuous rendering of decoded samples. |
| Traceentry | Objects | Single entry in the list. |
| representationid | String | The value of Representation@id from which the samples were taken.<br>This is an optional parameter and should not be reported in case of progressive download. |
| subreplevel | Integer | If not present, this metric concerns the Representation as a whole. If present, subreplevel indicates the greatest value of any SubRepresentation@level being rendered.<br>This is an optional parameter and should not be reported in case of progressive download. |
| start | Real Time | The time at which the first sample was rendered. |
| sstart | Media Time | The presentation time of the first sample rendered. |
| duration | Integer | The duration of the continuously presented samples (which is the same in real time and media time). "Continuously presented" means that the media clock continued to advance at the playout speed throughout the interval. |
| playbackspeed | Real | The playback speed relative to normal playback speed (i.e. normal forward playback speed is 1.0). |
| stopreason | Enum | The reason why continuous presentation of this representation was stopped. Either:<br>representation switch (not relevant in case of progressive download)<br>rebuffering<br>user request<br>switch from unicast to broadcast<br>switch from broadcast to unicast<br>switch to a different content delivery network (CDN)<br>end of period<br>end of content<br>end of a metrics collection period<br>failure |

Since the playlist metric captures events that cause interruption of a continuous presentation of a given representation by the 'stopreason' parameter, inclusion of access switching events based on 'switch from unicast to broadcast (and/or multicast)' and 'switch from broadcast (and/or multicast) to unicast' enumerations again allows for identification of the access method used to transport the related DASH-formatted content, and helps toward understanding possible reasons behind any associated rebuffering events (or other forms of QoE degradation), which will also be captured by the playlist metric. Again, such a modification enables a more accurate understanding on how client experience is impacted by access switching events and also on how the media player 124 operates across different DASH representations and access methods. Finally, "switch to a different CDN" enumeration may also be included to capture client experience upon access method changes on a broader context.

Figure 4:
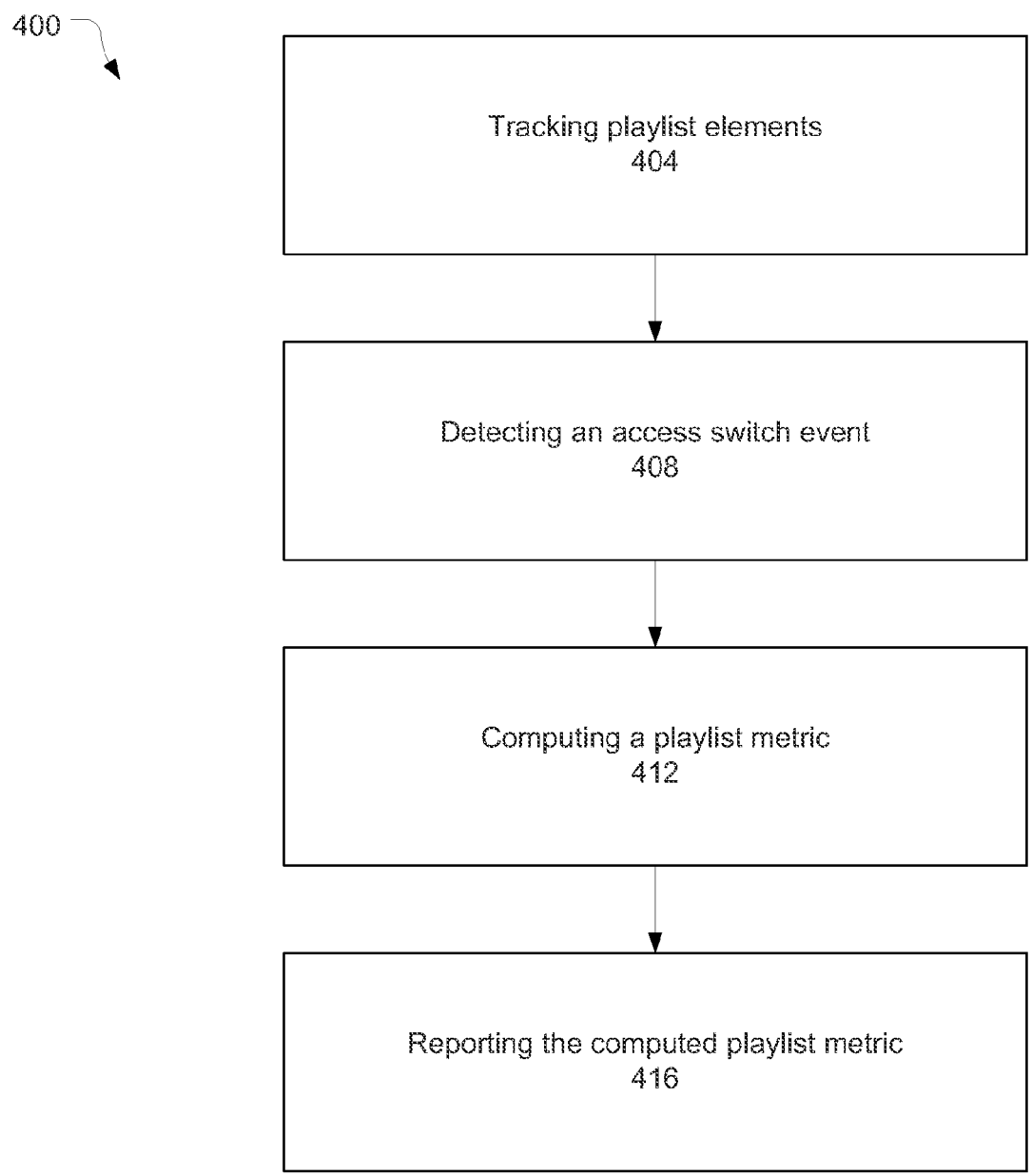
FIG. 4 illustrates a method of tracking and reporting another QoE metric in accordance with various embodiments.

FIG. 4 illustrates a tracking and reporting method 400 in accordance with some embodiments. Method 400 may be performed by a QoE monitoring module of a UE, such as QoE monitoring module 120 of UE 104. In some embodiments, the UE may include and/or have access to one or more computer-readable media having instructions stored thereon, that, when executed, cause the UE, or QoE monitoring module, to perform the method 400.

At 404, the method may include tracking playlist elements. The tracked elements may be, e.g., the elements listed in Table 2.

At 408, the method may include detecting an access switch event. As discussed above, an access switch event may be, e.g., a switch from a unicast to broadcast (and/or multicast) access method; a switch from a broadcast (and/or multicast) to unicast access method; and/or a switch to a different CDN.

Upon detection of an access switch event at 408, the method 400 may include computing a playlist metric at 412. In some embodiments, the computing of the playlist metric may include recording the tracked playlist elements, including the switched-to access method.

At 416, the method may include reporting the computed playlist metric. Reporting of the computed playlist metric may be done by transmitting the metric to a QoE reporting module, e.g., QoE reporting module 132 of media server 116.

In some embodiments, the QoE monitoring module 120 may record representation information from the MPD. This may allow, upon reporting of the QoE monitoring module 120, servers without direct access to the MPD to understand the used media characteristics. QoE monitoring module 120 may report the MPD information metric whenever the UE 104 sends any other quality metrics report containing references to a representation which MPD information has still not been reported. In this context, it may also be beneficial to include information on the access methods by which this representation is available. This may be indicated by a @transportID attribute, which may carry information on the available access methods to receive the media content representations.

Table 3 defines an MPD information metric for QoE reporting in accordance with some embodiments.

TABLE 3

| Key | Type | Description |
| --- | --- | --- |
| MPDInformation | Object | |
| representationid | String | Value of Representation@id for the representation addressed by the QoE metrics report. |
| subreplevel | Integer | If present, value of SubRepresentation@level for the subrepresentation addressed by the QoE metrics report. If not present, the QoE metrics report concerns the representation as a whole. |
| Mpdinfo | RepresentationType | Provides the MPD information for the representation or subrepresentation identified by representationid and subreplevel, if present. The following attributes and elements shall be present within mpdinfo if they are present for the identified representation or subrepresentation and their values shall be identical to those presented in the MPD: @bandwidth, @qualityRanking, @width, @height, @mimeType, and @codecs, @transportID. |

Figure 5:
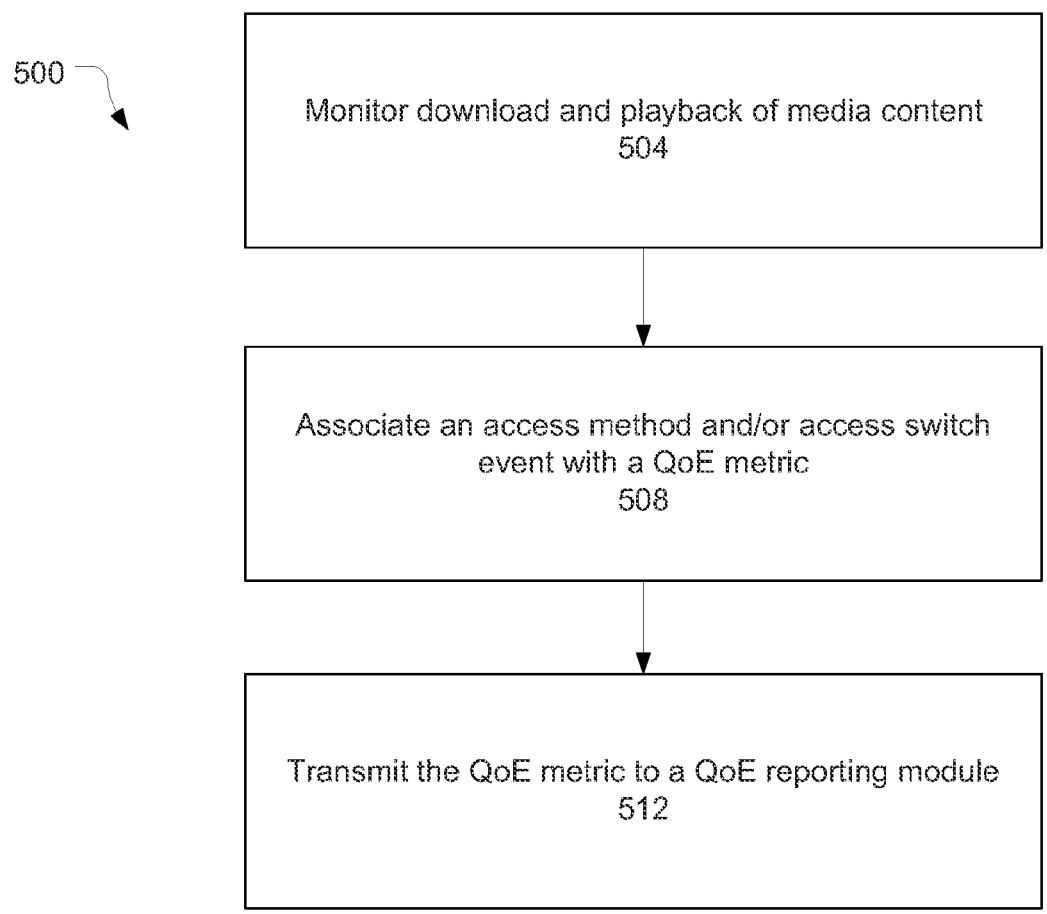
FIG. 5 illustrates a method QoE monitoring in accordance with various embodiments.

FIG. 5 illustrates a method 500 of QoE monitoring in accordance with some embodiments. Method 500 may be performed by a QoE monitoring module of a UE, such as QoE monitoring module 120 of UE 104. In some embodiments, the UE may include and/or have access to one or more computer-readable media having instructions stored thereon, that, when executed, cause the UE, or QoE monitoring module, to perform the method 500.

At 504, the QoE monitoring module may monitor a download and playback of media content, e.g., DASH-formatted content. The download and playback may be performed by a media player, e.g., media player 124. While monitoring the download and playback, the QoE monitoring module may record a number of QoE metrics. These metrics may include, but are not limited to, HTTP request/response transactions for media components delivered by the unicast access method, representation switch events, average throughput associated with the unicast access method, average throughput associated with multicast/broadcast access method, initial playout delay, buffer occupancy level, playlist, MPD information, etc.

At 508, the QoE monitoring module may associate an access method and/or an access switch event with one or more of the QoE metrics. For example, the access method may be recorded with respect to representation switch events, playlist, and/or MPD information as described above.

At 512, the QoE monitoring module may transmit the QoE metrics, including indication of the associated access method and/or access switch event, to a QoE reporting module, e.g., QoE reporting module 132 of media server 116. In some embodiments, the QoE metrics may be transmitted in a QoE report formatted as an extensible markup language (XML) document. The QoE monitoring module may use HTTP POST request signaling (RFC 2616) carrying XML-formatted metadata in its body to sent the QoE report to the media server.

In various embodiments, the transmission of the QoE metrics may be done in periodic or event-driven reports. An event-driven report may be prompted by one or more of the QoE metrics falling below a predetermined threshold or some other trigger.

In some embodiments, the QoE reporting may be activated/triggered on initiative of the UE 104 or the media server 116. The QoE reporting may be activated/triggered by the media server 116 or another server transmitting, to the QoE monitoring module, a reporting trigger. The reporting trigger may be in, e.g., an MPD file as, e.g., a metric element; an OMA DM QoE management object; and/or a session description protocol (SDP) message.

Figure 6:
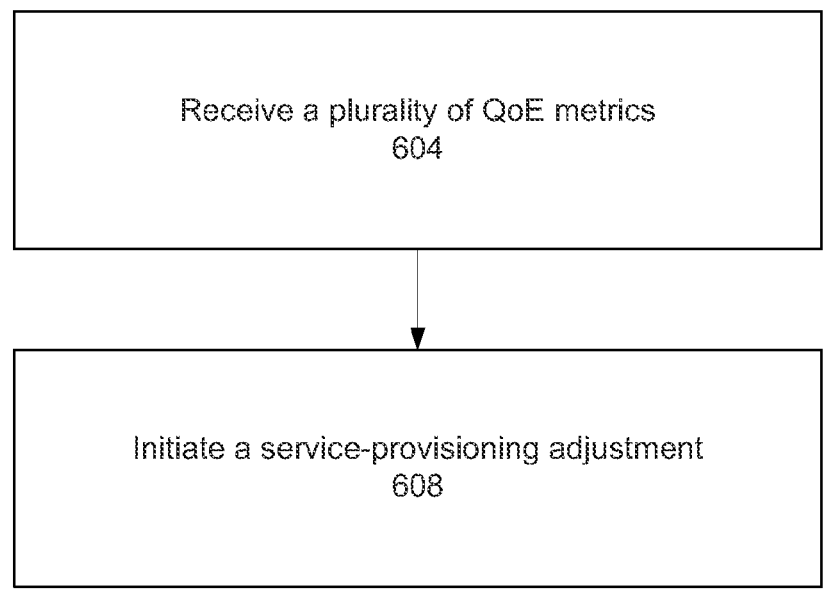
FIG. 6 illustrates a method for dynamic service provisioning adjustment in accordance with various embodiments.

FIG. 6 illustrates a method 600 for dynamic service provisioning adjustment in accordance with some embodiments. Method 600 may be performed by a QoE reporting module of a media server, such as QoE reporting module 132 of media server 116. In some embodiments, the media server may include and/or have access to one or more computer-readable media having instructions stored thereon, that, when executed, cause the media server, or QoE reporting module, to perform the method 600.

At 604, the QoE reporting module may receive a plurality of QoE metrics. The QoE metrics may be associated with a download and playback of media content delivered by a unicast access method and/or a multicast/broadcast access method. As discussed above, these received QoE metrics may include, but are not limited to, HTTP request/response transactions for media components delivered by the unicast access method, representation switch events, average throughput associated with the unicast access method, average throughput associated with multicast/broadcast access method, initial playout delay, buffer occupancy level, playlist, MPD information, etc. At least one of the received QoE metrics may be associated with an access method.

At 608, the QoE reporting module may initiate a service-provisioning adjustment. In some embodiments, the initiation of the service provisioning adjustment may be based on one or more of the received QoE metrics. For example, it may be determined that a client routinely switches from a particular representation of the DASH media content when that representation is delivered by a first access method. Accordingly, the QoE reporting module may bias the representation toward delivery by the second access method.

The service provisioning adjustment may be, but is not limited to, transcoding the DASH-formatted content from a first format to a second format; changing the access method from a first access method to a second access method; changing a fault detection and correction scheme employed in the delivery of the DASH-formatted content; and/or re-allocating radio resources for managing delivery of the DASH-formatted content by the unicast access method or the multicast/broadcast access method.

The QoE monitoring and feedback described herein may be beneficial for detecting and debugging failures, managing streaming performance, enabling intelligent client adaptation (useful for device manufacturers), and allowing for QoE-aware network adaptation and service provisioning (useful for the network operator and content/service provider).

Figure 7:
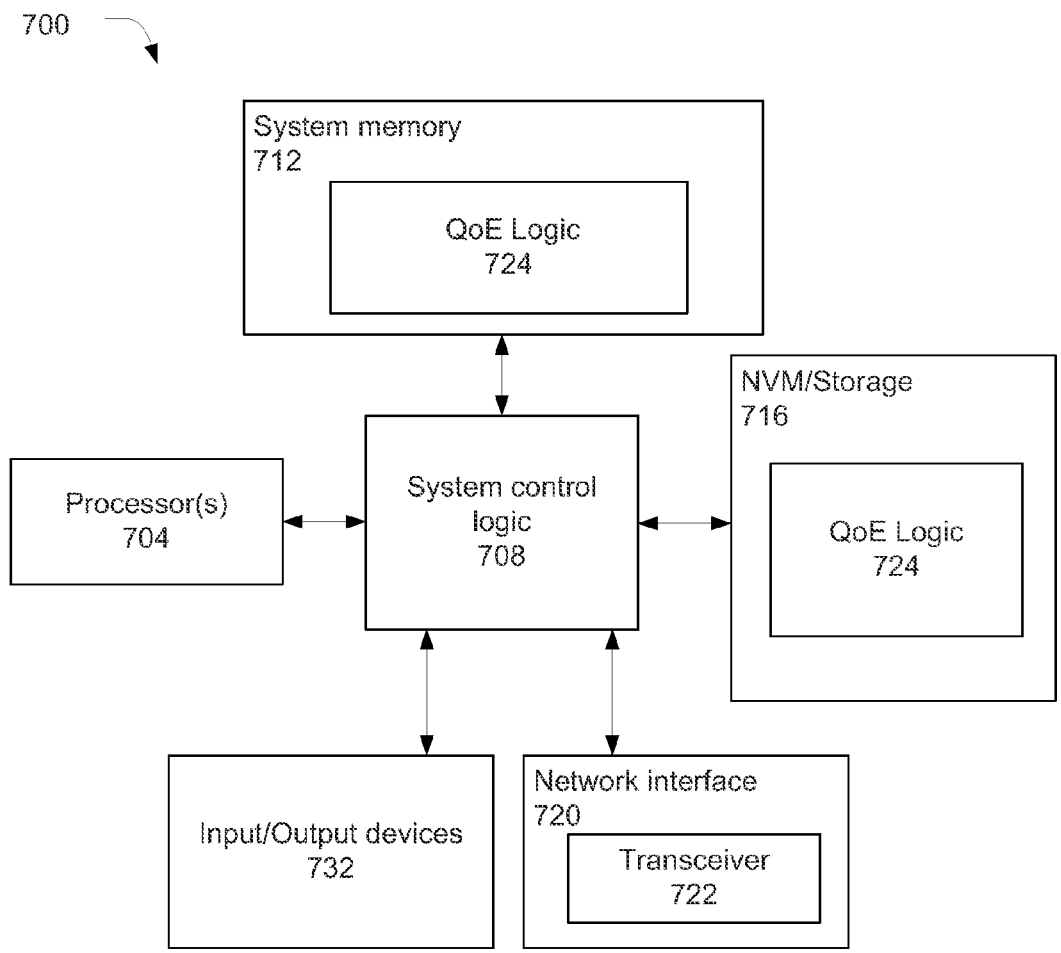
FIG. 7 schematically depicts an example system in accordance with various embodiments.

The UE 104 and/or media server 116 described herein may be implemented into a system using any suitable hardware and/or software to configure as desired. FIG. 7 illustrates, for one embodiment, an example system 700 comprising one or more processor(s) 704, system control logic 708 coupled with at least one of the processor(s) 704, system memory 712 coupled with system control logic 708, non-volatile memory (NVM)/storage 716 coupled with system control logic 708, a network interface 720 coupled with system control logic 708, and input/output (I/O) devices 732 coupled with system control logic 708.

The processor(s) 704 may include one or more single-core or multi-core processors. The processor(s) 704 may include any combination of general-purpose processors and dedicated processors (e.g., graphics processors, application processors, baseband processors, etc.).

System control logic 708 for one embodiment may include any suitable interface controllers to provide for any suitable interface to at least one of the processor(s) 704 and/or to any suitable device or component in communication with system control logic 708.

System control logic 708 for one embodiment may include one or more memory controller(s) to provide an interface to system memory 712. System memory 712 may be used to load and store data and/or instructions, e.g., QoE logic 724. System memory 712 for one embodiment may include any suitable volatile memory, such as suitable dynamic random access memory (DRAM), for example.

NVM/storage 716 may include one or more tangible, non-transitory computer-readable media used to store data and/or instructions, e.g., QoE logic 724. NVM/storage 716 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 716 may include a storage resource physically part of a device on which the system 700 is installed or it may be accessible by, but not necessarily a part of, the device. For example, the NVM/storage 716 may be accessed over a network via the network interface 720 and/or over Input/Output (I/O) devices 732.

The QoE logic 724 may include instructions that, when executed by one or more of the processors 704, cause the system 700 to perform QoE monitoring, QoE reporting, and/or service provisioning adjustments as described with respect to the above embodiments. In various embodiments, the QoE logic 724 may include hardware, software, and/or firmware components that are disposed in additional/alternative elements of the system 700.

Network interface 720 may have a transceiver 722 to provide a radio interface for system 700 to communicate over one or more network(s) and/or with any other suitable device. In various embodiments, the transceiver 722 may be integrated with other components of system 700. For example, the transceiver 722 may include a processor of the processor(s) 704, memory of the system memory 712, and NVM/Storage of NVM/Storage 716. Network interface 720 may include any suitable hardware and/or firmware. Network interface 720 may include a plurality of antennas to provide a multiple input, multiple output radio interface. Network interface 720 for one embodiment may include, for example, a wired network adapter, a wireless network adapter, a telephone modem, and/or a wireless modem.

For one embodiment, at least one of the processor(s) 704 may be packaged together with logic for one or more controller(s) of system control logic 708. For one embodiment, at least one of the processor(s) 704 may be packaged together with logic for one or more controllers of system control logic 708 to form a System in Package (SiP). For one embodiment, at least one of the processor(s) 704 may be integrated on the same die with logic for one or more controller(s) of system control logic 708. For one embodiment, at least one of the processor(s) 704 may be integrated on the same die with logic for one or more controller(s) of system control logic 708 to form a System on Chip (SoC).

In various embodiments, the I/O devices 732 may include user interfaces designed to enable user interaction with the system 700, peripheral component interfaces designed to enable peripheral component interaction with the system 700, and/or sensors designed to determine environmental conditions and/or location information related to the system 700.

In various embodiments, the user interfaces could include, but are not limited to, a display (e.g., a liquid crystal display, a touch screen display, etc.), speakers, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 720 to communicate with components of a positioning network, e.g., a global positioning system (GPS) satellite.

In various embodiments, the system 700 may be a mobile computing device such as, but not limited to, a laptop computing device, a tablet computing device, a netbook, a smartphone, etc. In various embodiments, system 700 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. One or more non-transitory computer readable media having instructions that, when executed, cause a dynamic adaptive streaming over hypertext transfer protocol (DASH) client on a user equipment (UE) to:

download, by a processor of the UE, segments of a media stream from a server, the segments being DASH segments provided to the DASH client by a unicast access method or a broadcast access method, the segments to be received at the UE by a transceiver of a network interface and placed in memory of the UE;

record, in the memory of the UE while monitoring download and playback of the segments of the media stream, a quality of experience (QoE) metric related to playback of the segments of the media stream, wherein the QoE metric includes an indication of a switch to the unicast access method or the broadcast access method; and transmit, from the UE using the transceiver of the network interface, the QoE metric to a QoE reporting server, wherein the QoE metric comprises a playlist metric to log a list of playlist elements for one or more playback periods in a measurement interval and the list of playlist elements includes a stop-reason parameter that includes the indication of the switch as a reason why a continuous presentation of a representation of the media stream was stopped.

2. The one or more non-transitory computer-readable media of claim 1, wherein the broadcast access method is a multimedia broadcast/multicast service (MBMS) or file delivery over unidirectional transport (FLUTE)-based access method and the unicast access method is a hypertext transfer protocol (HTTP)-based access method.

3. The one or more non-transitory computer-readable media of claim 1, wherein the instructions, when executed, further cause the DASH client to:

obtain a reporting trigger in a media presentation description (MPD), an open mobile alliance (OMA) device management (DM) QoE management object, or in a session description protocol (SDP) message; and transmit the QoE metric based on the reporting trigger.

4. An apparatus comprising:

a media player having a processor to download segments of a media stream from a server, the segments provided by a unicast access method or a broadcast access method;

a quality of experience (QoE) monitoring module coupled to the media player, the QoE monitoring module to:

record, in memory of the apparatus while monitoring download and playback the segments of the media stream, a QoE metric related to the playback of the segments of the media stream, wherein the QoE metric includes an indication of a switch to the unicast access method or the broadcast access method; and transmit the QoE metric to a QoE reporting server, wherein the QoE metric comprises a playlist metric to log a list of playlist elements for one or more playback periods in a measurement interval and the list of playlist elements includes a stop-reason parameter that includes the indication of the switch as a reason why a continuous presentation of a representation of the media stream was stopped.

5. The apparatus of claim 4, wherein the broadcast access method is a multimedia broadcast/multicast service (MBMS) or file delivery over unidirectional transport (FLUTE)-based access method and the unicast access method is a hypertext transfer protocol (HTTP)-based access method.

6. The apparatus of claim 4, wherein the QoE monitoring module is to:

obtain a reporting trigger in a media presentation description (MPD), an open mobile alliance (OMA) device management (DM) QoE management object, or in a session description protocol (SDP) message; and transmit the QoE metric based on the reporting trigger.

7. The apparatus of claim 4, further comprising:

a touchscreen display, wherein the media player is to render the media stream on the touchscreen display.

8. The apparatus of claim 4, wherein the media player is to:

receive a first portion of the media stream via the unicast access method; and receive a second portion of the media stream via the broadcast access method.

9. A method comprising:

downloading, by a processor of a user equipment, segments of a media stream from a server, the segments provided to a dynamic adaptive streaming over hypertext transfer protocol (DASH) client by a unicast access method or a broadcast access method;

recording, in memory of the user equipment, while monitoring download and playback of the segments, a quality of experience (QoE) metric related to the playback of the segments of the media stream, wherein the QoE metric includes an indication of a switch to the unicast access method or the broadcast access method; and transmitting, by the user equipment, the QoE metric to a QoE reporting server, wherein the QoE metric comprises a playlist metric to log a list of playlist elements for one or more playback periods in a measurement interval and the list of playlist elements includes a stop-reason parameter that includes the indication of the switch as a reason why a continuous presentation of a representation of the media stream was stopped.

10. The method of claim 9, wherein the broadcast access method is a multimedia broadcast/multicast service (MBMS) or file delivery over unidirectional transport (FLUTE)-based access method and the unicast access method is a hypertext transfer protocol (HTTP)-based access method.

11. The method of claim 9, further comprising:

receiving a reporting trigger in a media presentation description (MPD), an open mobile alliance (OMA) device management (DM) QoE management object, or in a session description protocol (SDP) message; and transmitting the QoE metric based on the reporting trigger.

12. The method of claim 9, further comprising:

receiving a first portion of the media stream via the unicast access method; and receiving a second portion of the media stream via the broadcast access method.

* * * * *